United States Patent [19]
Mashino et al.

[11] Patent Number: 5,093,583
[45] Date of Patent: Mar. 3, 1992

[54] ELECTRIC POWER SUPPLY SYSTEM FOR AUTOMOBILE

[75] Inventors: Keiichi Mashino, Katsuta; Shigeki Tezuka, Yokohama; Tohru Futami, Fujisawa; Yuji Nakajima, Yokohama, all of Japan

[73] Assignees: Hitachi, Ltd., Tokyo; Nissan Motor Co., Ltd., Yokohama, both of Japan

[21] Appl. No.: 438,017

[22] Filed: Nov. 20, 1989

[30] Foreign Application Priority Data

Nov. 21, 1988 [JP] Japan ............................. 63-292308
Dec. 9, 1988 [JP] Japan ............................. 63-309980

[51] Int. Cl.$^5$ ........................................... H02P 9/26
[52] U.S. Cl. ................................. 307/10.1; 219/203; 363/126
[58] Field of Search ............... 363/126, 129, 175; 307/9.1, 10.1, 16, 17, 84; 219/202, 203, 219, 522, 547; 322/7, 80, 90, 93, 94, 97

[56] References Cited

U.S. PATENT DOCUMENTS

| | | |
|---|---|---|
| 4,084,126 | 11/1978 | Clements . |
| 4,668,270 | 5/1987 | Ramus . |
| 4,678,982 | 7/1987 | Offiler et al. . |
| 4,730,097 | 3/1988 | Campbell et al. ............ 219/522 X |
| 4,780,619 | 10/1988 | Campbell et al. ............ 363/126 X |

FOREIGN PATENT DOCUMENTS 0256689 2/1988 European Pat. Off. .
2352087 8/1976 Fed. Rep. of Germany .
3719376 12/1987 Fed. Rep. of Germany .
63-69500 3/1988 Japan .

*Primary Examiner*—R. Skud
*Assistant Examiner*—Emanuel Todd Voeltz
*Attorney, Agent, or Firm*—Antonelli, Terry Stout & Kraus

[57] ABSTRACT

This specification discloses an electric power supply system for an automobile having a load which needs a higher voltage than the normal battery voltage. The electric power supply system of the present invention includes: a multi-phase AC generator having an armature winding, a field winding, a first rectifier for rectifying a multi-phase AC output of the armature winding, and a voltage regulation circuit for controlling a current in the field winding in accordance with a control signal to regulate an output voltage of the first rectifier; a battery charged by a DC output voltage of the first rectifier; a low-voltage load to be powered by the battery; a multi-phase transformer including a primary winding connected to a multi-phase AC output of the armature winding and a secondary winding for inducing a secondary multi-phase voltage higher than the voltage in the primary winding, the primary and secondary windings being electrically insulated from each other; a second rectifier for rectifying the multi-phase secondary voltage from the multi-phase transformer; and a high-voltage load to be powered by a DC output of the second rectifier.

25 Claims, 13 Drawing Sheets

FIG. I

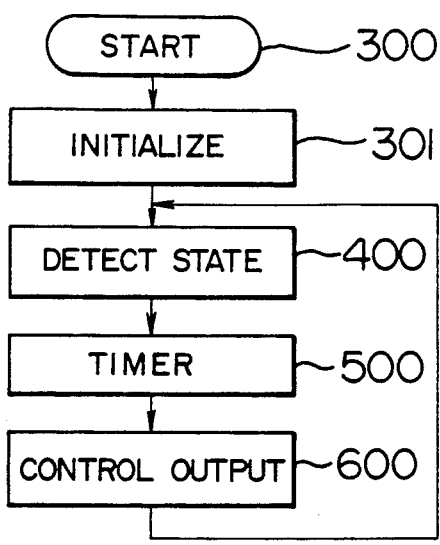
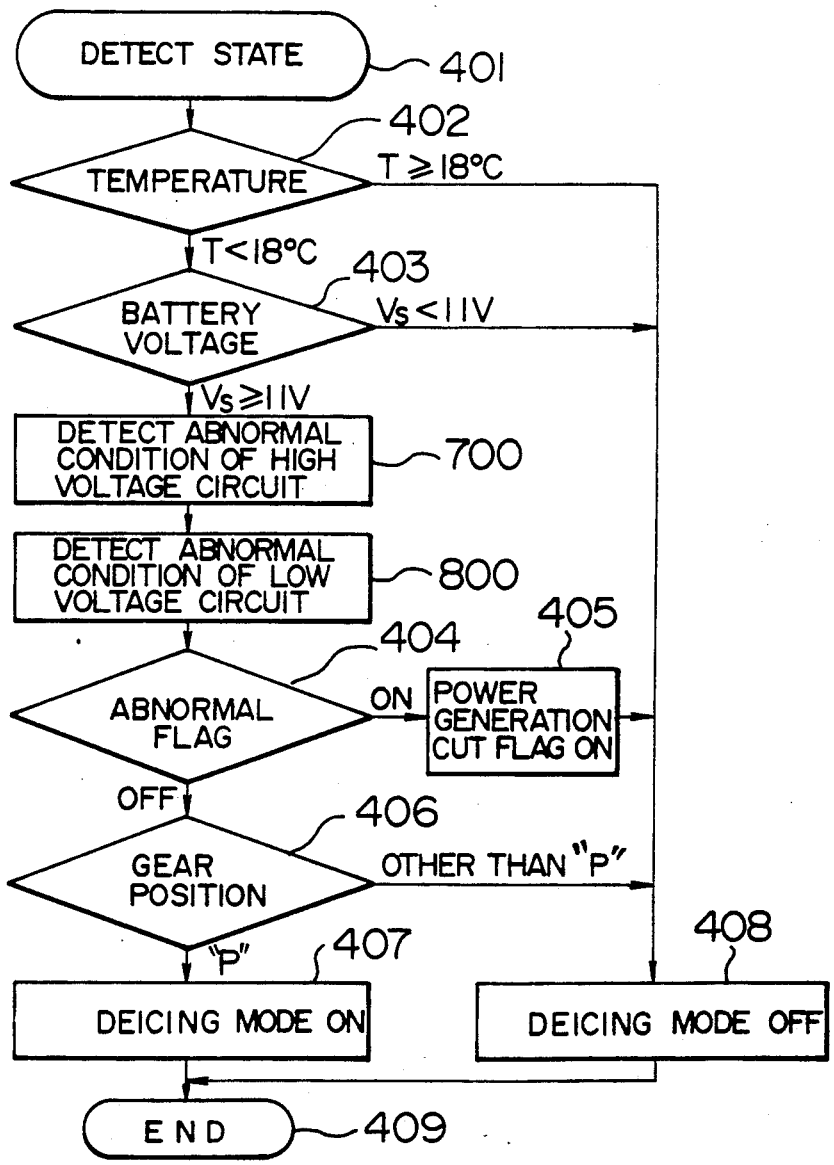

ELECTRIC POWER SUPPLY SYSTEM FOR AUTOMOBILE

BACKGROUND OF THE INVENTION

This invention relates to an electric generator system for an automobile, and particularly to an electric power supply system for use in an automobile having loads which require higher voltages than the normal battery voltages As such a high voltage load in the present automobile field, there is known the deicing heater for the automobile's windshield Since the deicing heater needs a high electric power, the power supply voltage must be high. Heating systems for melting the ice stuck to the automobile's windshield glass in a short time are proposed in U.S. Pat. No. 4,084,126 granted to Clements and issued on Apr. 11, 1978, and in U.S. Pat. No. 4,668,270 granted to Ramus and issued on May 6, 1987. In addition, power supplies for vehicles which generate high voltages re disclosed in JP-A-63-9500 filed by General Motors Corporation with priority based on U.S. patent application Ser. Nos. 897,023 (now abandoned) and 50,999 (now U.S. Pat. No. 4,780,619) filed on Aug. 15, 1986 and on May 15, 1987, respectively. In these power supplies for heaters, a voltage is generated by an AC generator and rectified into the normal DC rated voltage In addition to the rated voltage, for obtaining a high voltage a field current is increased to increase the output voltage from the generator or the rated voltage is boosted by a transformer. The various equipments for automobiles are mounted to be in positions easy for repair and maintenance, and there may be an opportunity to be damaged by a traffic accident or the like. Therefore, even by either approach for high voltage, a highly reliable power supply must be produced which is capable of preventing short-circuiting accidents, and has no adverse effect on the other low-voltage circuits even under the operation of the high-voltage circuit.

Accordingly, it is an object of this invention to provide a high-reliability power supply for vehicles which is capable of maintaining the high-voltage circuit safe and simultaneously supplying power to both a high-voltage circuit and a low-voltage circuit.

SUMMARY OF THE INVENTION

According to one embodiment of this invention, there is provided a power supply for a vehicle comprising a multi phase AC generator driven by an engine of the vehicle, and including an armature winding, a field winding, a first rectifier for rectifying a multi-phase AC output of the armature winding, and a voltage regulation circuit for controlling a current in the field winding in accordance with a control signal to regulate an output voltage of the first rectifier; a battery charged by a DC output voltage of the first rectifier; a low-voltage load to be powered by the battery; a multi-phase transformer including a primary winding connected to a multi-phase AC output of the armature winding and a secondary winding for inducing a secondary multi-phase voltage higher than the voltage in the primary winding, the primary and secondary windings being electrically insulated from each other; a second rectifier for rectifying the multi-phase secondary voltage from the multi-phase transformer; and a high-voltage load to be powered by a DC output of the second rectifier. In this embodiment, since the secondary of the transformer in which a high voltage is induced is insulated from the primary, the high-voltage circuit is floated from the ground, and thus if anyone should touch the high-voltage circuit, there is much less possibility of electric shock and short circuit. In addition, the high voltage and low voltage can be supplied at the same time. Moreover, to the above arrangement can be added a safety device which utilizes a combination of high-voltage and low-voltage to protect against an abnormal voltage.

According to another embodiment of this invention, there is provided a power supply for a vehicle comprising: a multi-phase AC generator driven by an engine of the vehicle, and including an armature winding, a field winding, a rectifier for rectifying a multi-phase AC output of the armature winding, and a voltage regulation circuit for regulating an output voltage of the rectifier by controlling the current in the field winding in accordance with a control signal; a battery charged by a DC output voltage of the rectifier; a low-voltage load to be powered by the battery; a high-voltage load needing a voltage higher than that needed by the low-voltage load; a switch responsive to a switching signal to selectively connect a DC output of the rectifier to the high voltage load or the battery; a voltage converter for converting a high voltage across the high-voltage load into a lower voltage and applying it to the battery; and a controller responsive to a high-voltage output indicating signal to supply a control signal to the voltage regulation circuit, thereby causing it to increase the field current, and to supply a switching signal to the switch, thereby causing it to connect the DC output of the rectifier to the high-voltage load. In this embodiment, the generator generates a high voltage by the increase of the exciting current without use of any transformer. While a high voltage is generated, the converter for converting the high voltage into low voltage is operated so that both high voltage and low voltage can be supplied at the same time. This embodiment has the advantages that the power conversion efficiency is greater than the method of obtaining a high voltage by use of a transformer, and that a heavy-weight transformer is not necessary.

The high voltage loads to which the power supply of this invention can be used include, in addition to the deicing heater, a heater for burning out diesel particulate. In addition, it can be used with other electrical loads which rapidly consume large power.

BRIEF DESCRIPTION OF THE DRAWINGS

FIG. 3 is a main flow chart of the controller shown in FIG. 1;

FIGS. 4 to 8 are subroutine flow charts of the controller;

DESCRIPTION OF THE PREFERRED EMBODIMENTS

Figure 1:
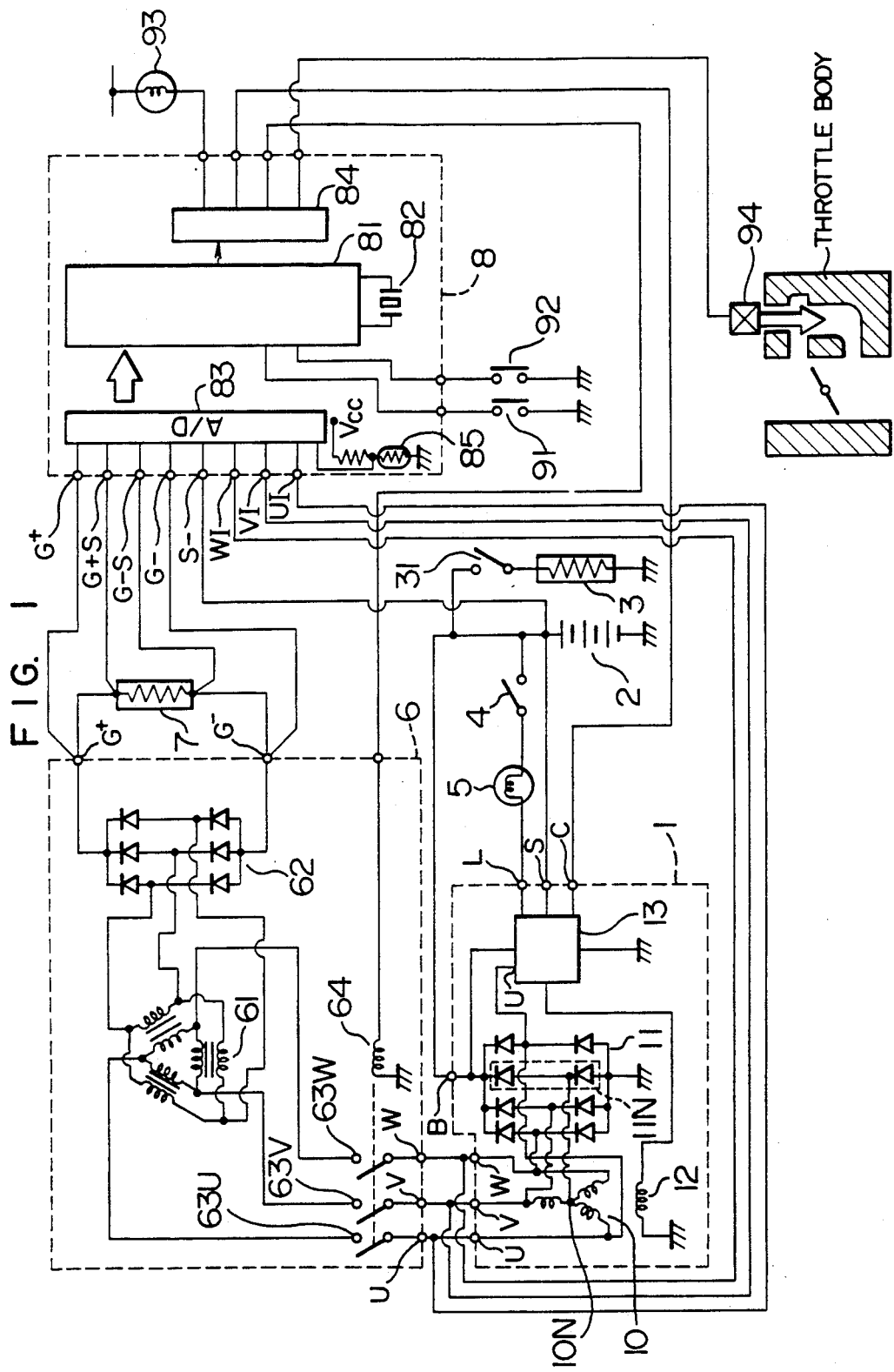
FIG. 1 shows the arrangement of one embodiment of a power supply for a vehicle according to this invention.

One embodiment of this invention will be described with reference to FIG. 1. FIG. 1 is a circuit diagram of a power supply for automobiles according to this invention. Referring to FIG. 1, there is shown a generator 1 which is driven by an engine (not shown). This generator is formed of armature windings 10 connected in a three-phase star, a rectifier 11 for rectifying the AC outputs of the armature winding 10, a field winding 12 for supplying magnetic flux to the armature winding 10 and a voltage regulator 13 for regulating the generated voltage by controlling the current in the field winding 12. Shown at 2 is a battery which is charged by the DC output of the generator 1 and supplies power through a switch 31 to a low-voltage load 3 (for example, headlights and an air conditioner). In addition, there are shown a key switch 4 which is provided at the driver's seat, a charge indicating light 5 mounted on the instrument board, and a power converter 6. This power converter comprises a three-phase transformer 61 of delta connection, a rectifier 62 for full-wave-rectifying the three phase AC outputs boosted by the three-phase transformer 61, relay contacts 63u, 63v, 63w for connecting the three-phase output terminals u, v, w of the generator to the three-phase transformer 61, and a relay coil 64. Shown at 7 is a heater evaporated on a windshield glass. The current in the heater is controlled by a controller 8. The controller 8 comprises a microcomputer 81, a quartz resonator 82, an A/D (analog/digital) converter 83, an output register 84, and a temperature sensor 85. The temperature sensor 85 detects the temperatures in the inside and outside of the car. Shown at 91 is a switch which is operated by the driver so that the controller 8 is actuated to control the heater to start the deicing operation. Shown at 92 is a switch which is closed at the "P" position (parking range) of the automatic transmission (not shown). Shown at 93 is a deicing indication lamp such as a light emitting diode, and at 94 is an idle speed control valve for controlling the amount of bypass air of the throttle valve to thereby adjust the idle speed of the engine.

Figure 2:
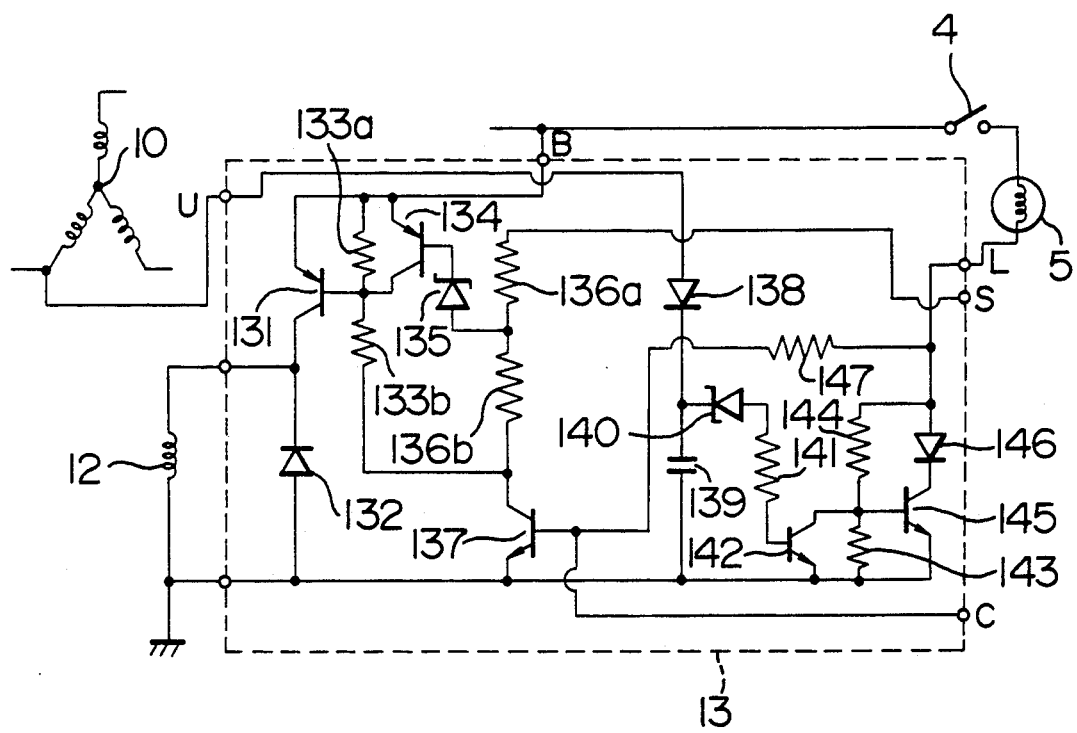
FIG. 2 is a circuit diagram of a voltage regulator in this invention.

FIG. 2 is a circuit diagram of the voltage regulator 13 in FIG. 1. This voltage regulator 13 comprises: a voltage regulation circuit including a PNP power transistor 131 for supplying current to the field winding 12, a flywheel diode 132, resistors 133a, 133b and a transistor 134 for driving the transistor 131, a Zener diode 135, resistors 136a, 136b, a transistor 137 for supplying power to the above circuit, and a resistor 147; and a circuit block which energizes the charge indication lamp 5 and which includes a diode 138, a capacitor 139, a Zener diode 140, a resistor 141, a transistor 142, resistors 143, 144, a transistor 145, and a diode 146.

The operation of the arrangement will be described below. When the driver turns on the key switch 4 in FIG. 1 to thereby make the starting operation, the voltage of the battery 2 is applied to the L-terminal of the generator through the charge indication lamp 5, thus permitting the voltage regulator 13 to start operation. In the circuit arrangement of FIG. 2, when the voltage is applied to the L-terminal, the transistor 137 is turned on through the resistor 147, so that the collector potential of this transistor drops to substantially the ground potential. Then, the voltage regulation circuit starts to operate. When the engine stops, the battery voltage is also low, and thus the voltage at the junction between the voltage dividing resistors 136a and 136b is low. Therefore, the Zener diode 135 is not broken and thus the transistor 134 is inoperative. As a result, the base current of the power transistor 131 flows through the register 133b, turning the power transistor 131 on. Thus, a current is flowed in the field winding 12. At this time, the generator 1 does not operate, and thus a voltage is not induced in the armature winding 10. Thus, the Zener diode 140 is not broken, the transistor 142 is cut off, and the transistor 145 becomes conductive, causing the charge indication lamp 5 to be lit. Then, when the engine starts to rotate the rotor (not shown) including the field winding 12 of the generator 1, an AC voltage is induced in the armature winding 10. This voltage is peak-rectified by the capacitor 139 through the diode 138, thereby causing the transistor 142 to turn on through the Zener diode 140. Thus, the transistor 145 is cut off, extinguishing the charge indication lamp 5.

When the engine increases its revolution speed to increase the AC voltage induced in the armature winding 10, the battery 2 is charged through the rectifier 11 and the B-terminal of the generator 1. When the voltage of the battery 2 is higher than a specified value, the voltage at the S-terminal of the voltage regulator 13 increases to increase the voltage at the junction between the voltage dividing resistors 136a and 136b. As a result, the Zener diode 135 is broken, the transistor 134 is turned on, and the power transistor 131 is cut off, so that the current flowing in the field winding 12 is attenuated through the flywheel diode 132. When the current in the field winding 12 is attenuated, the output voltage of the generator 1 is reduced to decrease the voltage at the S-terminal of the voltage regulator. Then, contrary to the above-mentioned operation, the power transistor 131 is turned on, the field winding 12 is supplied with current, and the output voltage of the generator 1 again increases. The above operations are repeated so that the battery voltage is adjusted to be a constant value Shown at 61 is an insulation transformer which is supplied with the voltage of each phase from the armature winding 10 as the primary voltage and induces the secondary voltages higher than the primary voltages. The primary and secondary are electrically insulated, and the secondary is floated from both of the ground and the battery potential. The secondary high voltages of the transformer 61 are rectified by the rectifier 62 into a DC high voltage, which is applied to the heater 7.

The deicing operation will be described. FIG. 3 is a main flow chart for the control operation of the microcomputer 81 of the controller 8. When the power supply is turned on, at step 300 the program is started. At step 301, the registers, memories and input and output ports are initialized. At step 400, the state of an input signal and so on are detected, and at step 500 the timer controlling is made to control the order of the operations of the whole controller 8. At step 600, the output state is controlled, and then at step 400 the infinite loop is started to repeat until the power supply is turned off.

Figure 5:
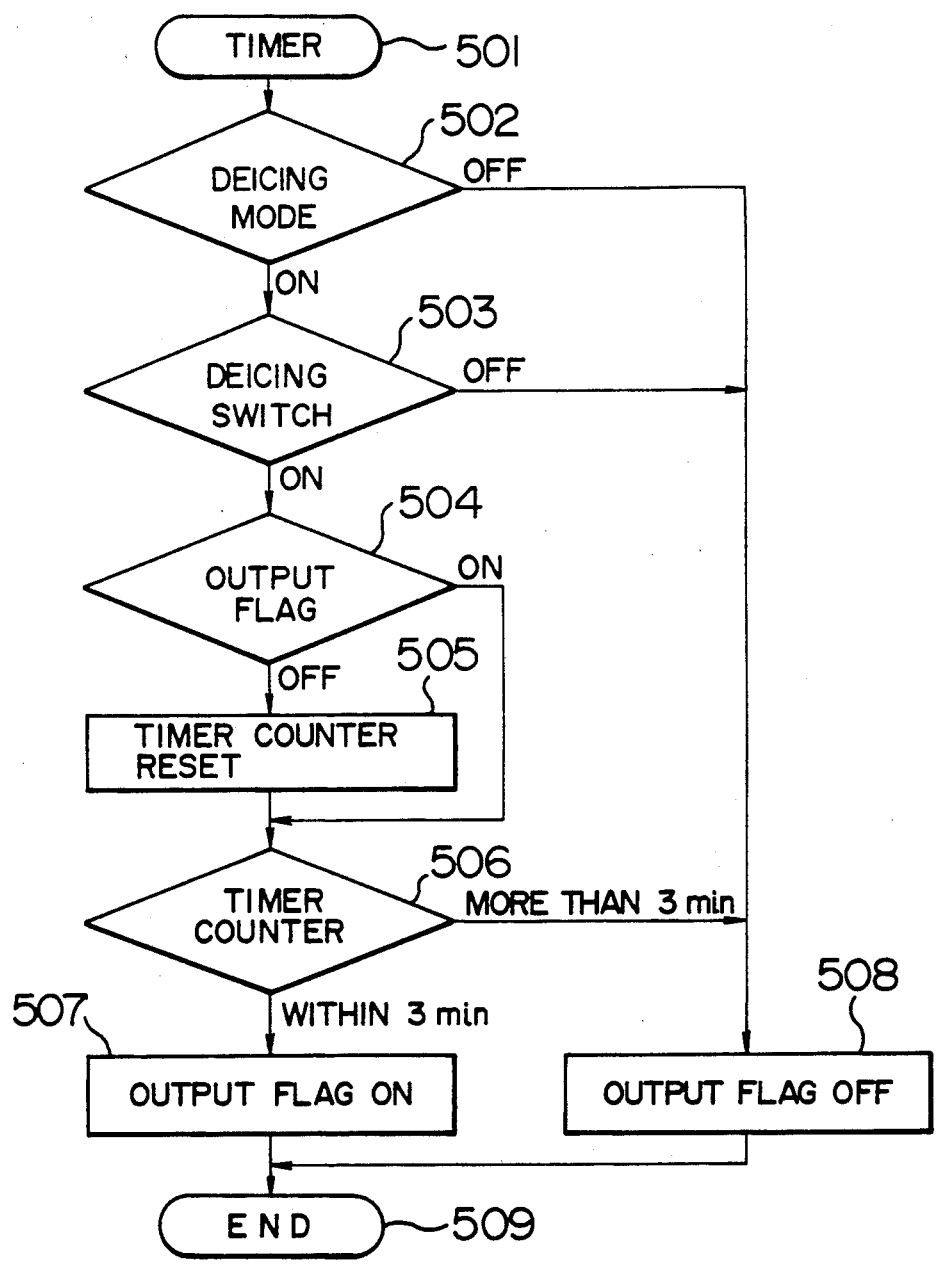
Figure 6:
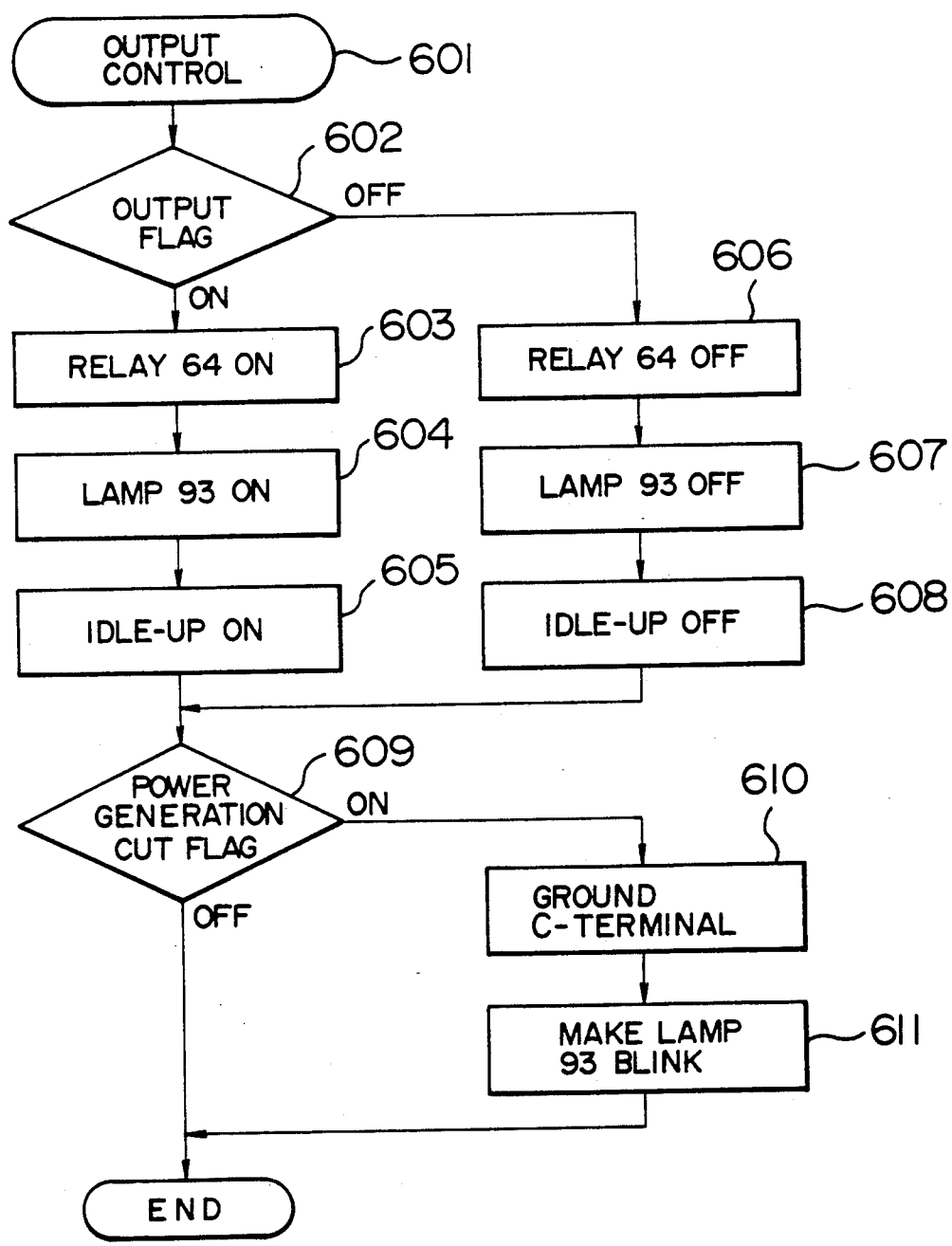

The routines of steps 400, 500 and 600 will be mentioned in detail in FIGS. 4, 5 and 6, respectively.

FIG. 4 is a subroutine of the step 400 shown in FIG. 3. At step 402, the temperature is detected. In this case, the analog signal from the temperature sensor 85 shown in FIG. 1 is converted into a digital signal by the AD converter 83. When the temperature T is 18° C., or above, the deicing operation is not necessary, and thus the deicing mode is turned off at step 408. When the temperature T is lower than 18° C., the program advances to step 403. At step 403, decision is made of whether the battery voltage exceeds 11V or not. If the battery voltage is lower than 11V, the deicing mode is turned off at step 408 to avoid excessive discharge. When the battery voltage is 11V or above, it is decided that the deicing operation can be made, and the program advances to step 700. At step 700, detection is made of whether the high voltage circuit is abnormal or not. At step 800, detection is made of whether the low voltage circuit is abnormal or not. The routines of steps 700 and 800 will be mentioned in detail later. At step 404, decision is made of whether an abnormal flag is present or not. If the high voltage circuit or low voltage circuit is abnormal, the abnormal flag turns on, and at step 405 the power generation cut flag is turned on. At step 408, the deicing mode is turned off.

Then, the gear position of the automatic transmission is detected by the switch 92. When the gear position is not the parking position "P", the program progresses to step 408, where the deicing mode is turned off. When the gear position is the "P" position, the program advances to step 407, where the deicing mode is turned on. By the above program, the deicing mode is turned on or off. In the manual transmission car, the deicing mode can be turned on at the neutral position in place of the parking position. In this embodiment, the deicing operation is completed before a driving operation. However, when the car starts to move under an incomplete condition in which the ice on the window is melted to a certain extent that the field of vision is assured, and when the car continues the deicing operation during the driving operation, in the program the deicing mode may be turned on during the driving operation.

FIG. 5 is a detailed program of the step 500 shown in FIG. 3. At step 502, decision is made of whether the deicing mode is on or off. If the deicing mode is off, the program advances to step 508, where the output flag is turned off. When the deicing mode is on, the program advances to step 503, where detection is made of whether the deicing switch 91 is closed or not. When the deicing switch 91 is off, the program advances to step 508, where the output flag is turned off. When the deicing switch is on, at step 504 the state of the output flag is examined. When the output flag is on, or when the output flag is already on at the time of the previous execution of the program, the timer counter is not reset. When the output flag is off, or when the deicing switch is first turned on this time, at step 505 the timer counter is reset. At step 506, the contents of the timer counter is examined Three minutes or more after the deicing switch 91 is turned on, the program advances to step 508, where the output flag is turned off. When the time lapse is within 3 minutes, the program advances to step 507, where the output flag is turned on. Thus, the selection of the on/off condition of the output flag is completed. The timer counter is interrupted at constant intervals of time, to increase its contents. The reason for setting of timer to three minutes is that when the heater 7 is powered for three minutes or more, it may be damaged due to overheating. The time at which the timer is set is arbitrary in accordance with the heater size.

FIG. 6 shows the routine for controlling the output condition. At step 602, the state of the output flag is examined. When the output flag is on, at step 603 the relay 64 is energized. When the relay 64 is energized, the contacts 63u, 63v and 63w in FIG. 1 are closed, allowing the three phase AC voltages in the armature windings 10 to be transmitted to the primary windings of the three phase transformer 61 and boosted. The voltages induced in the secondary windings are converted into DC by the rectifier 62 and power the heater 7. Thus, the heater 7 generates heat by the application of a high voltage high power thereto, to start melting the ice on the windshield glass. At step 604 in FIG. 6, the indication lamp 604 is lit, informing the driver of melting ice. At step 605, a signal is supplied to the idle up control valve 94, so that the engine increases the idle speed. Thus, the electric power from the generator 1 can be increased.

When the output flag is off, at step 606 the relay 64 is deenergized, the current to the three phase transformer 61 is cut off, and the high voltage is stopped from being supplied. At step 607, the deicing lamp 93 is extinguished, and at step 608 the idle-up is stopped.

At step 609, the state of the generation cut flag is examined. When the generation cut flag is on, the C-terminal of the voltage regulator 13 is grounded, making the cut off of the power generation. When the C-terminal of the voltage regulator 13 in FIG. 2 is grounded, the transistor 137 is turned off, and thus the base current is not supplied to the power transistor 131 so that the power transistor 131 is turned off. No current is flowed in the field winding 12, resulting in the stop of power generation. Then, no voltage is induced in the armature winding 10, the transistor 142 is turned off, the transistor 145 is conductive, and the charge indication lamp 5 is lit. At step 611, the deicing lamp 93 is energized to blink, notifying the driver of the abnormal condition.

Figure 7:
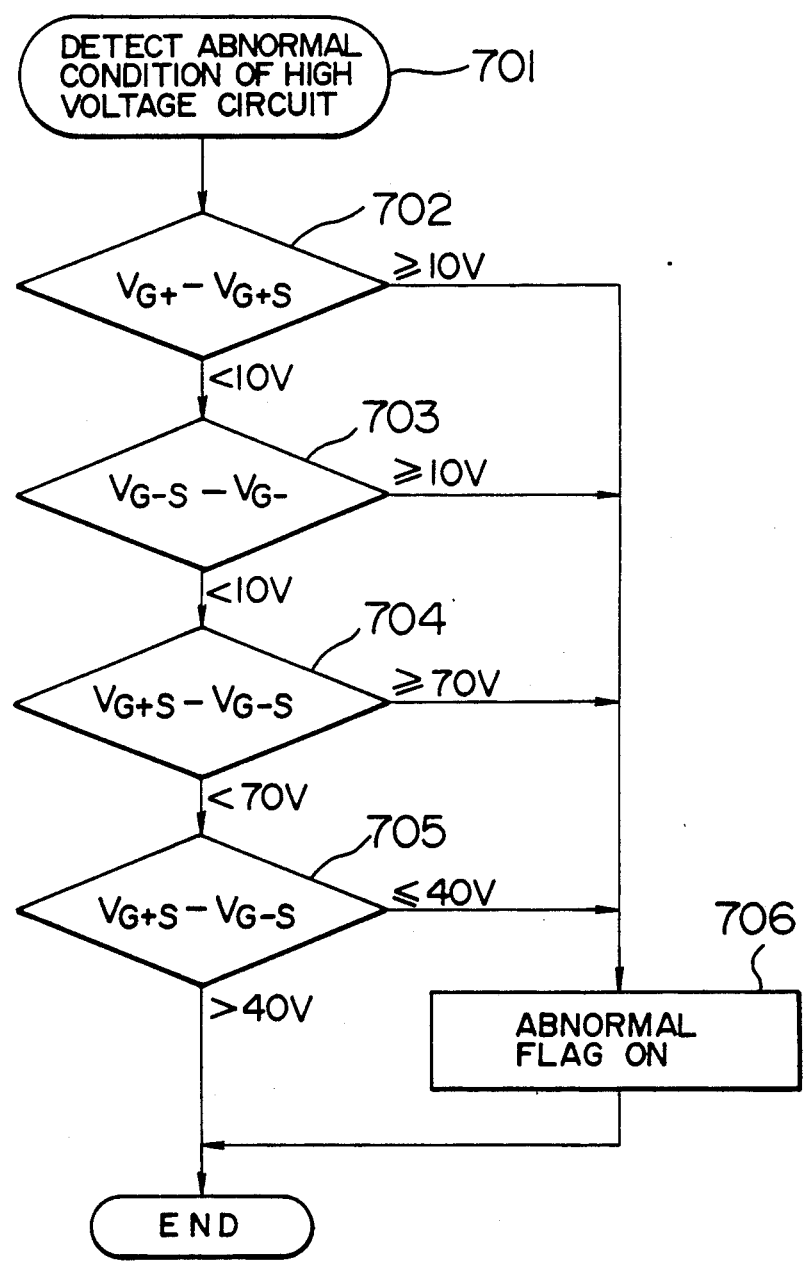

The method of detecting the abnormal condition of the high voltage circuit is shown in the flow chart of FIG. 7. At steps 702 and 703, examination is made of the potential difference between the output terminals G+, G— of the power converter 6 and the heater terminals G+S, G—S. If an abnormal value of 10V or above is detected, it is considered that there is an abnormal defect in the wiring system ranging from the output terminal of the high voltage rectifying circuit 62 to the heater 7, and the program advances to step 706, where the abnormal flag is turned on.

At steps 704 and 705, the voltage between the high voltage output terminals is checked about abnormality and decision is made of whether it is within a voltage range preset on the basis of the characteristics of the three phase transformer 61 and the heater 7. When at step 704 the voltage is abnormally high, then it is considered that the heater 7 is broken. When at step 705 the voltage is abnormally low, there is the possibility that the heater 7 is shorted or that the G+ terminal is grounded. Then, at step 706, the abnormal flag is turned on.

Figure 8:
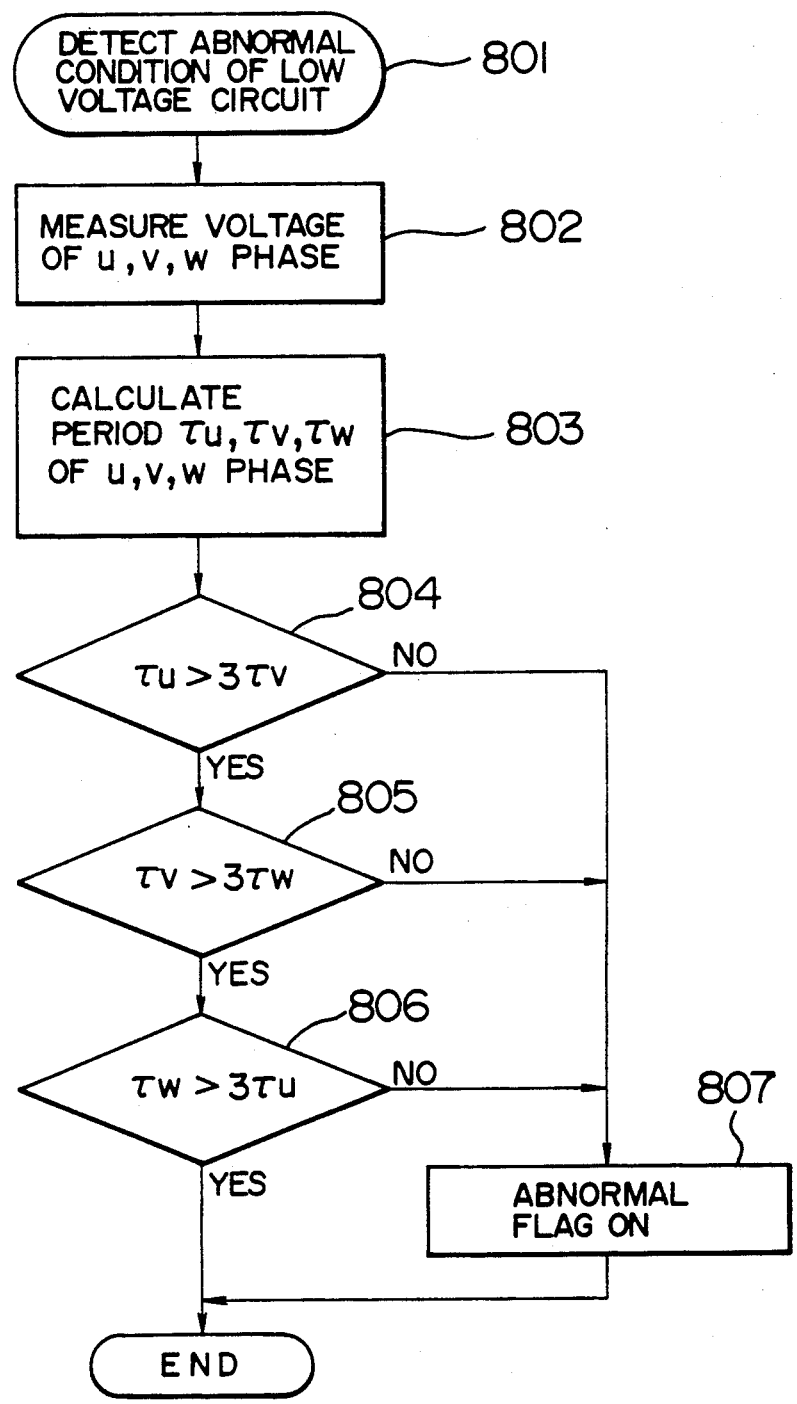
Figure 9:
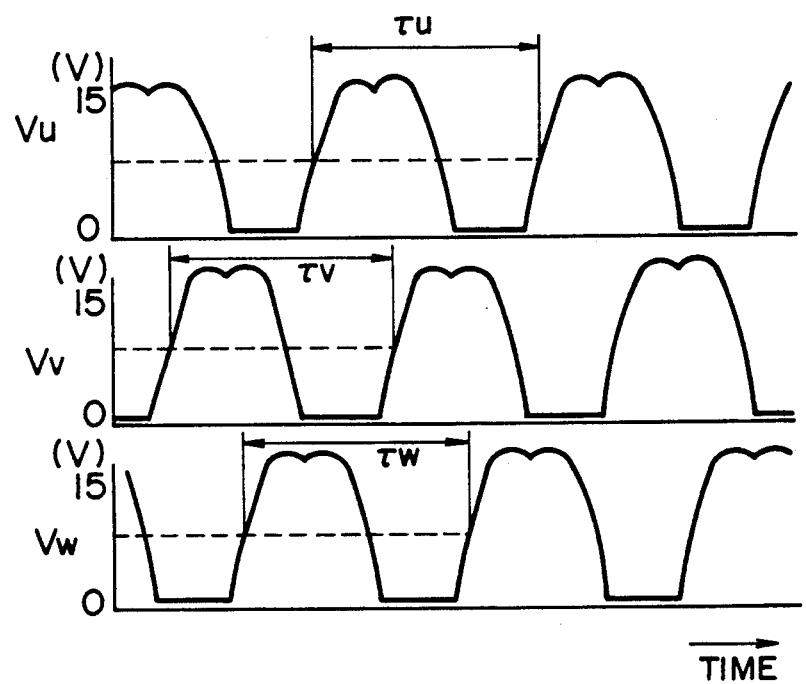
FIG. 9 is a waveform diagram useful for explaining the principle of the operation in the flow chart of FIG. 8.

The method of detecting the abnormal condition of the low voltage circuit is shown in the flow chart of FIG. 8. At step 802, the voltage of each phase (phase of u, v, w) of the three phase armature winding 10 is measured. FIG. 9 shows one example of the voltage waveforms of phase u, v, w. Thus, normally the AC waveform of 120° phase difference is observed. At step 803, the period τu, τv, τw of each phase is calculated. As illustrated in FIG. 9, the period is defined by the time difference between the points at which the waveform passes about 7.5V. When at steps 804, 805 and 806 each period is much longer than the other periods (here, the limit is assumed to be three times), the program advances to step 807, where the abnormal flag is turned on.

In this embodiment, when the wiring system for the ice melting device has a defect, for example, when the wiring in the high voltage system is broken or shorted or the wiring (phase of u, v, w) in the low voltage system is grounded by mistake, then the power generation is stopped, and the deicing indication lamp 93 is energized to blink, issuing the alarm to the driver, the safety of the vehicles thus being improved. To detect the abnormal condition of the low voltage system, the balance of the three phase periods is monitored. Moreover, since the primary and secondary are insulated by the insulation transformer 61, the driver does not receive an electric shock even if the high voltage system is touched by hand by mistake. Also, since the armature winding 10 of the low voltage system is connected in star, a neutral point diode 11N can be added, and thus the output of the low voltage system can be increased as described in the Japanese Patent Publication JP-B-44-4451.

Figure 10:
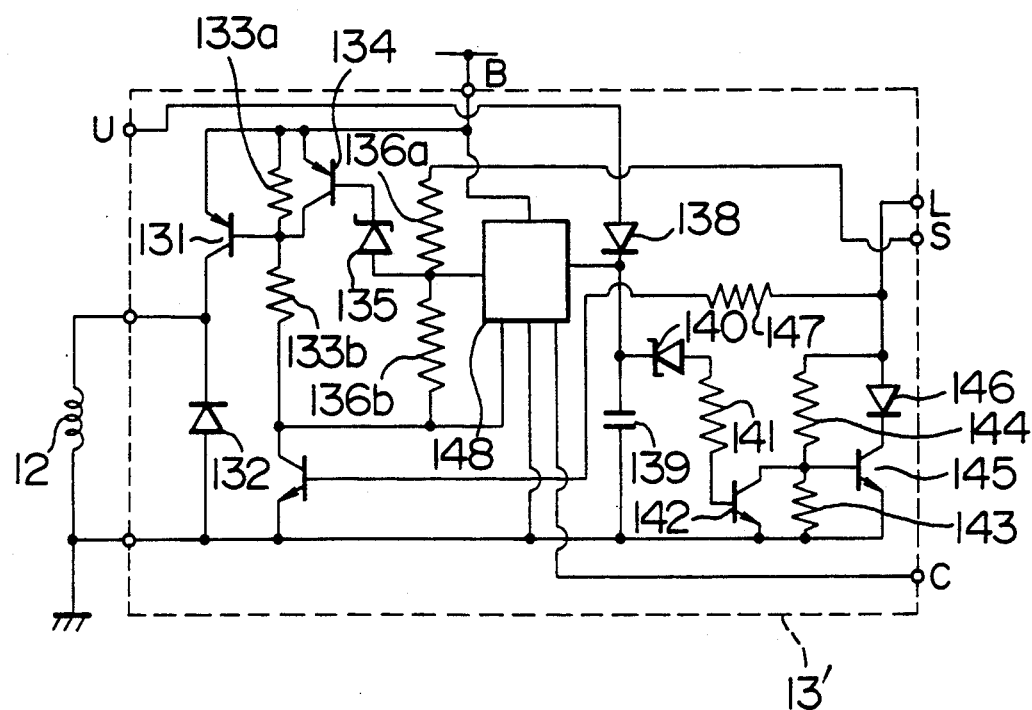
FIG. 10 is a circuit diagram of another example of the voltage regulator in this invention.
Figure 11:
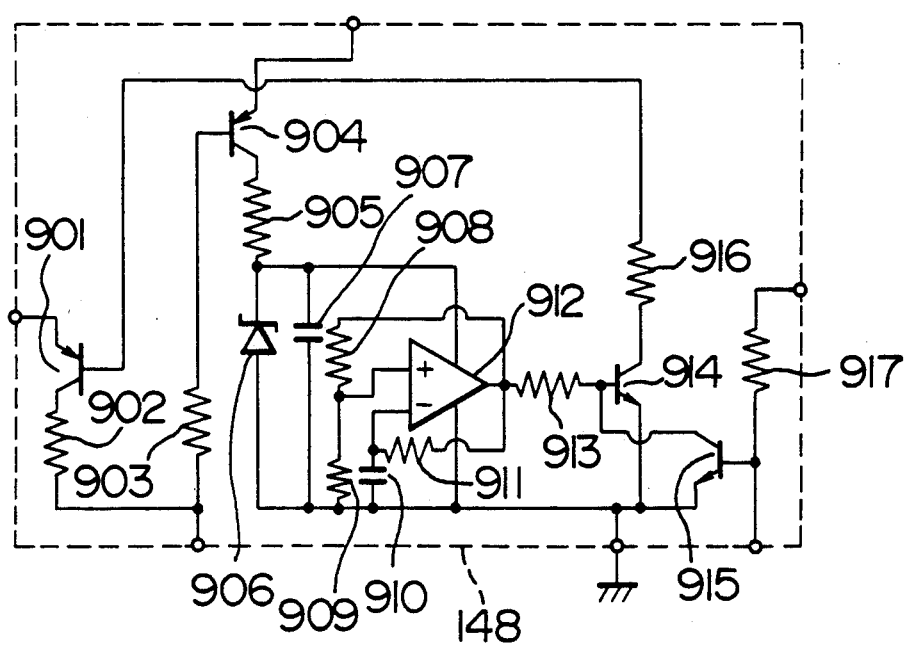
FIG. 11 is a circuit diagram of an example of the oscillator shown in FIG. 10.

Another embodiment of this invention will be described with reference to FIGS. 10 and 11. FIG. 10 shows a modification 13' of the voltage regulator 13 of FIG. 2, this modification having an initial exciting function added. The initial exciting function reduces the exciting current to a minimum to save current consumption until the generator rotates to start power generation even if the key switch 314 is on. In FIG. 10, like elements corresponding to those in FIG. 2 are identified by the same reference numerals. There is shown an oscillator 148, of which the construction is shown in FIG. 11. In FIG. 11, there are shown transistors 901, 904, 914, 915, a comparator 912, resistors 902, 903, 905, 908, 909, 911, 913, 916, 917, a Zener diode 906, and capacitors 907, 910. In this circuit arrangement, when the u-phase voltage as one phase of the armature winding 10 is low, the transistor 915 is cut off, the output of the oscillation circuit comprising the comparator 912, resistors 908, 909, 911 and the capacitor 910 is supplied through the transistors 914, 901 to change the voltage at the junction between the voltage dividing resistors 136a and 136b of the voltage regulator 13' with the lapse of time, thereby supplying a moderate duty signal to the power transistor 131 so that when the generator 1 is not operated the current dissipated in the field winding 12 is suppressed. When the generator 1 starts operating, the transistor 915 is turned on, the transistors 914, 901 are turned off, and thus the oscillation signal is not transmitted to the voltage regulator 13', thus the normal voltage regulation operation being made. On the other hand, in the output control routine of FIG. 6, when at step 610 the C-terminal is grounded, the transistor 915 in FIG. 11 is cut off, and the voltage regulator 13' is returned to the initial exciting condition, thus the field current being limited. The duty at the initial exciting time is set in the range from about 10% to 30%, so that the amount of power generation is greatly suppressed. This embodiment realizes both the initial exciting mode and the ice melting device output stopping mode at the same time.

Figure 12:
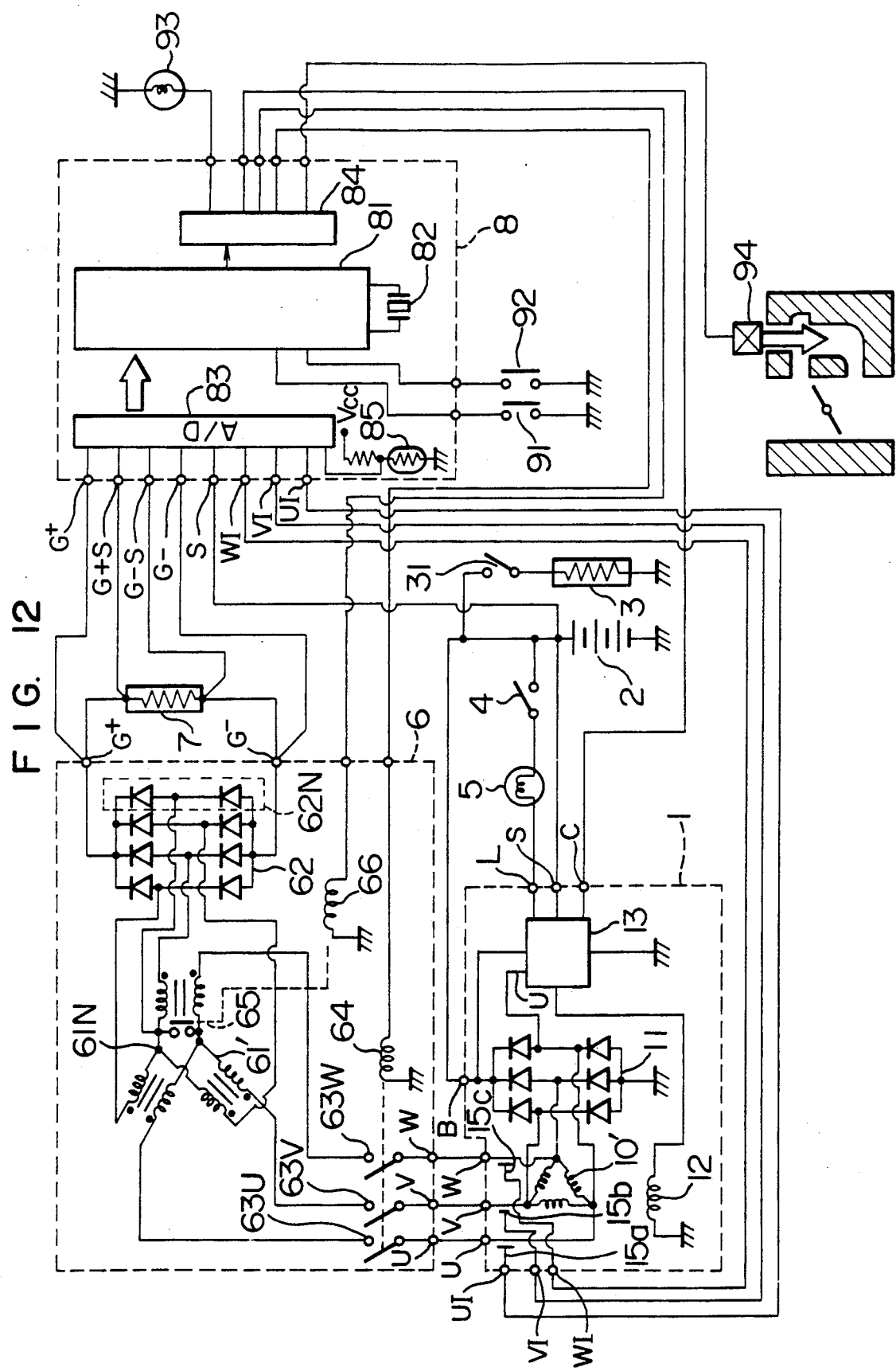
FIG. 12 is the arrangement of another embodiment of a power supply for a vehicle according to this invention.

FIG. 12 is a circuit diagram of a third embodiment of a power supply for vehicles according to this invention. In FIG. 12, like elements corresponding to those in FIG. 1 are identified by the same reference numerals. In FIG. 12, an armature winding 10' is connected in three phase delta, and a three phase transformer 61' is in star connection. Shown at 15a, 15b and 15c are current sensors for detecting the currents of respective phases in the armature winding 10'. In this embodiment, for detecting the abnormal condition of the low voltage circuit, the currents are detected in place of the voltages of respective phases mentioned with reference to FIG. 8, thereby detecting the abnormal condition. In this case, as shown in FIG. 8 the periods of voltage waveforms are not necessary to be found, and instead, when the absolute values of currents exceed a preset value, the abnormal flag is turned on. Also, while in FIG. 1 the AC component at the neutral point 10N of the armature winding 10 is rectified so that the output in the low voltage system is increased, this embodiment utilizes the AC component at the neutral point 61N of the three phase transformer 61' for the contribution to the increase of power in the high voltage system. The neutral point rectifying action is the application of the principle described in the Japanese Patent Publication JP-B-44-4451. According to this embodiment, it is easy to detect the abnormal condition in the low voltage system, and thus the program can be simplified, resulting in low cost. Moreover, there is the merit that the high voltage output is increased by the neutral rectification in the high voltage system. Furthermore, in this embodiment, the contacts 65 and a relay coil 66 are provided for shorting the primary and secondary windings of the transformer 61'when the heater 7 requires large power. For example, in a cold weather, the contacts 65 are closed so that the output voltages of the transformer are connected in series, and thus a higher voltage can be produced.

According to the embodiments of this invention, since in the power supply to be used for melting the ice on the windshield of the vehicle, the high voltage generation operation or power generation itself can be stopped when the AC current transmission lines or the output transmission lines are shorted, the conventional problems of emitting smoke and damage by burning can be solved, thus the safety being improved.

Still another embodiment of an electric power supply for vehicle according to this invention will be mentioned.

The power supplies in the embodiments of FIGS. 1 and 12 employ transformers for producing high voltages. In these embodiments, low and high voltages can be easily obtained at a the same time, and the high voltage circuit can be insulated from the low voltage circuit. In this case, the transformers have relatively large energy losses since the power conversion efficiency is about 60% to 70% when the voltage conversion is substantially made from 12V in the primary to 60V×12A in the secondary. In this embodiment of this invention which will be mentioned below, both high and low voltages can be simultaneously obtained at a high efficiency without using any transformer.

In the generator for an automobile, the output voltage is changed with the change of field current, and when the maximum field current is flowed, a high voltage of 60V or above can be produced. In the normal way of usage, the field current is suppressed by the voltage regulator so that the output voltage is controlled to be a voltage as low as about 14.5V. When a high voltage heater for melting ice is used, the control on the field current is stopped, so that the maximum current can be flowed to induce a high voltage in the generator. At the same time, the high voltage produced from the generator is converted by the voltage converter into a low voltage, and therefore the battery can be prevented from discharging since the low voltage can be produced at the same time. Moreover, by using a switching regulator as this voltage converter, it is possible to increase the efficiency to about 70% to 80%. When the voltage is boosted by a transformer, the input frequency is determined by the revolution speed of the generator, for example, when the revolution speed of the generator is 3000 rpm and the number of poles is 12, the three phase AC frequency is given by $$(3000 \times 12)/60 = 600 \; (Hz) \tag{1}$$

Thus, it is physically difficult to increase the frequency. However, by using a self-exciting switching regulator, it is possible to make the switching frequency high and hence increase the efficiency.

Figure 13:
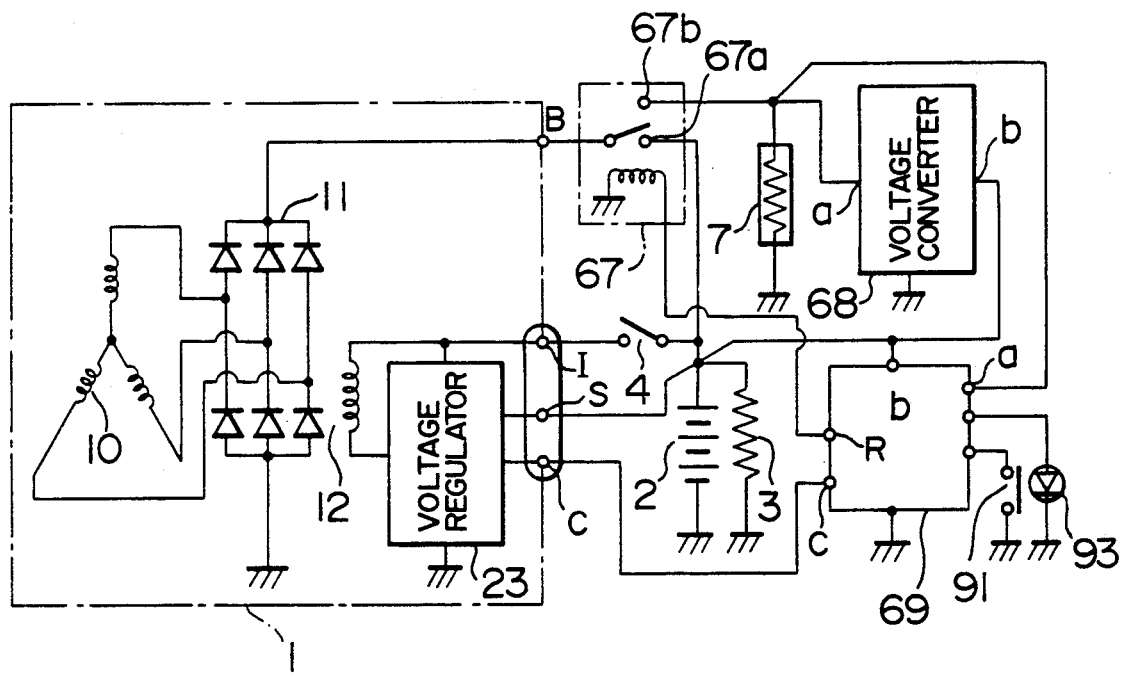
FIG. 13 is the arrangement of still another embodiment of a power supply for vehicles according to this invention.

This embodiment of the invention will be described with reference to FIG. 13. In FIG. 13, like elements corresponding to those in FIG. 1 are identified by the same reference numerals. There is shown the generator 1 which is driven by the engine (not shown). This generator comprises the three phase armature winding 10, the three phase full wave rectifier 11 for converting the AC output in the three phase armature winding 10 into DC, the field winding 12 for supplying magnetic flux to the three phase armature winding 10, and a voltage regulator 23 for controlling the field current in the field winding 12 to regulate the S-terminal voltage to a constant value. Shown at 2 is the battery which is charged by the generator 1 and which supplies power to the low voltage load 3 (for example, electrical loads in the fuel and ignition system). There are also shown the key switch 4, a relay 67 for allowing the generator output to be selectively supplied to the low voltage load 3 or the high voltage load 7 which is the deicing heater as a high voltage load, a voltage converter 68 for converting the high voltage into a low voltage, a controller 69 including a microcomputer for controlling the operation of the relay 67, the deicing switch 91 for starting the deicing operation, and the light emitting diode 93.

Figure 14:
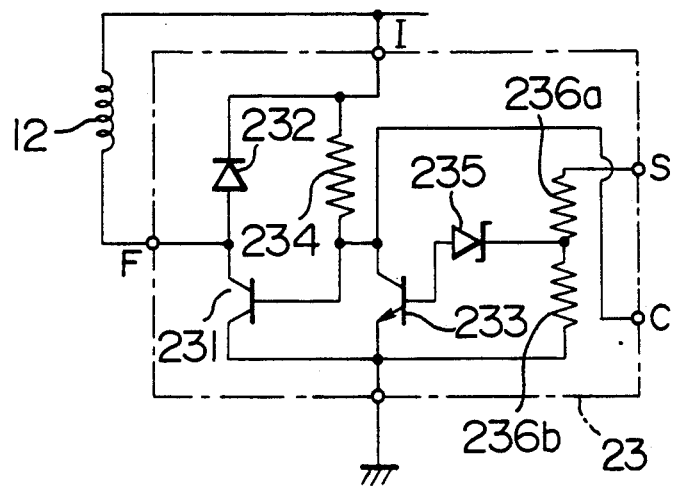
FIG. 14 is a circuit diagram of an example of the voltage regulator shown in FIG. 13.
Figure 15:
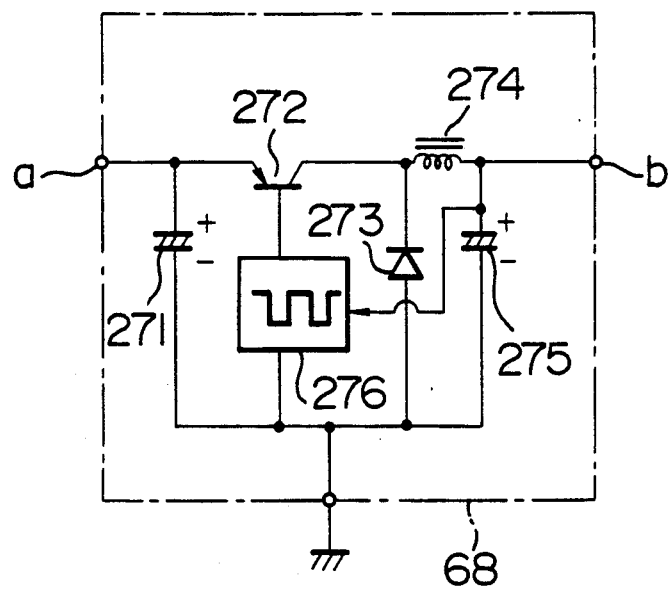
FIG. 15 is a circuit diagram of an example of the voltage converter shown in FIG. 13.

FIG. 14 is a circuit diagram of the voltage regulator 23 shown in FIG. 13. This voltage regulator comprises a power transistor 231, a flywheel diode 232, a controlling transistor 233, a resistor 234, a Zener diode 235, and voltage dividing resistors 236a, 236b. FIG. 15 is a circuit diagram of the voltage converter 68 which is formed of a voltage reducing type switching regulator. This voltage converter comprises smoothing capacitors 271, 275, a switching transistor 272, a flywheel diode 273, an inductor 274 and a PWM (pulse width modulation) circuit 276 for changing the flow rate of current in the transistor 272 in accordance with the output voltage.

The operation of this arrangement will now be described. When the key switch 4 in FIG. 13 is turned on, the battery 2 supplies current through the key switch 4, field winding 12 and the power transistor 231. Then, when the engine starts to rotate the rotor having the field winding 12 of the generator 1, a voltage is induced in the armature winding 10, converted into a DC by the rectifier 11, and supplied to the battery 2. At this time, the contacts 67a of the relay 67 are normally closed. When the engine revolution speed is further increased to increase the generation output voltage so that the voltage of the battery 2 exceeds a constant voltage, the Zener diode 235 is broken down through the S-terminal of the voltage regulator 23 and the voltage dividing resistors 236a, 236b. Thus, the transistor 233 becomes conductive, and as a result the power transistor 231 is turned off. The current flowing in the field winding 12 is attenuated through the flywheel diode 232, thus the generator output being decreased. When the voltage of the battery 2 is reduced, reversely the power transistor 231 is turned on, and the current in the field winding 12 is increased, thus the generator output being increased. The above operations are repeated, so that the voltage of the battery 2 is controlled to be a constant value (normally about 14.5V).

When the driver turns the switch 91 on, the controller 69 is operated, a positive voltage is applied to the R-terminal of the controller 69, and the contacts 67b of the relay 67 are closed. Then, the output of the generator 1 is applied to the heater 7, but no current is flowed to the battery 2. Thus, the voltage at the S-terminal of the voltage regulator 23 is decreased, causing the Zener diode 235 and transistor 233 to be continuously cut off and the power transistor 231 to be continuously conductive. Then, the maximum exciting current is flowed in the field winding 12 from the battery 2, so that a high voltage is induced in the armature winding 10. Accordingly, a high voltage is applied to the heater 7, thereby causing the ice on the windshield to be rapidly melted. Also, the high voltage is applied to the input terminal a of the voltage converter 68. In the voltage converter 68 in FIG. 15, the high voltage at the input terminal a is chopped by the transistor 272, and smoothed by the inductor 274 and the capacitor 275, thus the output being produced at the terminal b. The PWM circuit 276 receives the voltage at the terminal b, and controls the flow rate of the current in the transistor 272 to be increased when the input voltage is low, and decreased when it is high, thereby maintaining the voltage at the terminal b to be constant. If the voltage at the terminal b is set at about 14.0V, the S-terminal voltage of the voltage regulator 23 never exceeds the regulation voltage, 14.5V. Thus, the power transistor 231 of the voltage regulator 23 is kept conductive, and the output voltage of the generator 1 is maintained high.

Figure 16:
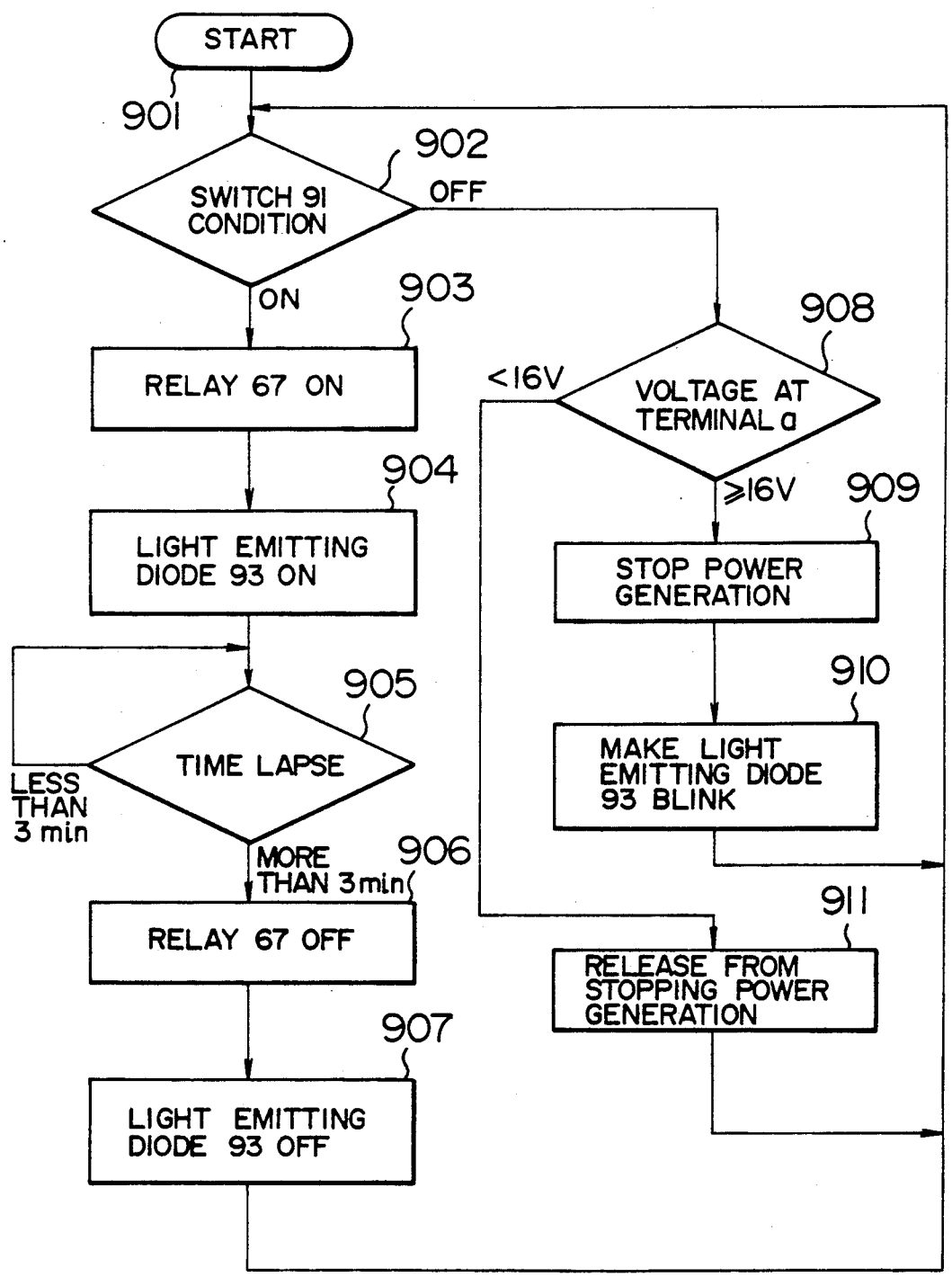
FIG. 16 is a flow chart for the operation of the controller shown in FIG. 13.

The operation of the controller 69 will be mentioned with reference to the flow chart of FIG. 16. As illustrated in FIG. 16, at step 901 the operation starts, and at step 902 the state of the switch 91 is detected. When the switch 91 is turned on, the program advances to step 903, where the relay 67 is energized so that a high voltage is generated. At this time, at step 904 the light emitting diode 93 is energized, informing the driver of deicing operation. At step 905, the time in which the high voltage is generated is monitored. When a predetermined time (here, 3 minutes) has elapsed, the program advances to step 906, where the relay 67 is deenergized, so that the high voltage is stopped from generation. At step 907, the light emitting diode 93 is extinguished. Then, at step 902, when the deicing switch 91 is again operated, the same operation is repeated.

We now consider that at step 902 the deicing switch 91 is not turned on. When the power supply is normally operating, the relay 67 is not energized, the contacts 67a are closed, and no voltage is applied to the contacts 67b. However, if the contacts of the relay 67 are fused to stick by some cause, the contacts 67b may be closed In such case, if this condition lasts for a long time, a high voltage is continuously applied to the heater 7, thereby overheating the windshield to damage the glass or burn the human operator. Thus, at step 908 the voltage (heater voltage) at the terminal a of the controller 69 is monitored, and when a constant value (16V) or above is applied, the program goes to step 909, where the power generation is stopped. Then, the light emitting diode 93 is energized to blink, urging the driver to make checking operation. For stopping the power generation at step 909, it is necessary to ground the terminal c of the controller 69. At this time, current is not flowed in the base of the power transistor 231 of FIG. 14, with the result that current is stopped from being flowed in the field winding 12. When again at steps 902, 908 the voltage at the terminal a decreases, the program advances to step 911, where the power generation is released from stopping by opening the terminal c.

In this embodiment, since the power supply for vehicles is able to supply power to the low voltage and high voltage loads at a time and at a high efficiency, the life of the battery can be extended, and particularly since the windshield can be prevented from being overheated when the contacts are fused to stick, the safety of the vehicle can be assured.

Furthermore, this embodiment can employ the countermeasure for detecting the abnormal condition in the high voltage and low voltage circuits (FIGS. 7 and 8) and the idle up function (FIG. 6).

We claim:

1. An electric power supply for a vehicle, comprising:
a multi-phase AC generator driven by an engine of said vehicle, and including an armature winding, a field winding, a first rectifier for rectifying a multi-phase AC output of said armature winding, and a voltage regulation circuit for controlling a field current in said field winding in accordance with a control signal to regulate a DC output voltage of said first rectifier;
a battery charged by the DC output voltage of said first rectifier;
a low-voltage load to be powered by said battery;
a multi-phase transformer including a primary winding connected to said multi-phase AC output of said armature winding and a secondary winding in which a multi-phase secondary voltage higher than a voltage in said primary winding is induced, said primary and secondary windings being electrically insulated from each other;
a second rectifier for rectifying said multi-phase secondary voltage from said multi-phase transformer; and
a high-voltage load to be powered by a DC output voltage of said second rectifier.

2. An electric power supply for a vehicle according to claim 1, further comprising first switch means for connecting or disconnecting said multi-phase AC output of said armature winding from said primary winding of said multi-phase transformer.

3. An electric power supply for a vehicle according to claim 2, further comprising means for producing a high voltage load signal indicative of powering said high voltage load, and a controller for energizing said first switch means in accordance with said signal, thereby connecting said multi-phase AC output of said armature winding to said primary winding of said multi-phase transformer.

4. An electric power supply for a vehicle according to claim 3, further comprising a control means for producing a signal to increase the revolution speed of said engine in response to said high-voltage load signal, and an electromagnetic valve for increasing the amount of intake air in said engine in accordance with said signal.

5. An electric power supply for a vehicle according to claim 4, further comprising gear position detecting means for detecting the gear position of the transmission of said vehicle, and control means for producing a signal to increase said revolution rate when said detecting means detects the parking or neutral position.

6. An electric power supply for a vehicle according to any one of claims 1 to 5, further comprising voltage detecting means for detecting phase voltages of the multi-phase AC output of said armature winding, and control means for comparing at least a period of one of the phase voltages with a period of another one of the phase voltages to thereby detect at least one period difference, and when said at least one period difference exceeds a first predetermined value, generating a control signal to decrease said field current regardless of the operation of said voltage regulation circuit.

7. An electric power supply for a vehicle according to any one of claims 1 to 5, further comprising voltage detecting means for detecting phase voltages of the multi-phase AC output of said armature winding, control means for comparing at least a period of one of the phase voltages with a period of another one of the phase voltages to thereby detect at least one period difference, and when said at least one period difference exceeds a first predetermined value, generating an alarm signal, and alarm means for receiving said alarm signal and lighting an indicator light.

8. An electric power supply for a vehicle according to any one of claims 2 to 5, further comprising means for detecting the DC output voltage of said second rectifier, and control means for producing an energizing signal to energize said first switch means when said DC output voltage of said second rectifier is a predetermined value or above, said first switch means being responsive to said energizing signal to disconnect the multi-phase AC output of said armature winding from the primary winding of said multi-phase transformer.

9. An electric power supply for a vehicle according to any one of claims 2 to 5, further comprising means for detecting the DC output voltage of said second rectifier, and control means for producing an energizing signal to energize said first switch means when said DC output voltage of said second rectifier is lower than a predetermined value, said first switch means being responsive to said energizing signal to disconnect the multi-phase AC output of said armature winding from the primary winding of said multi-phase transformer.

10. An electric power supply for a vehicle according to claim 8, further comprising means for detecting a voltage across said high-voltage load, wherein said control means calculates a difference between said DC output voltage of said second rectifier and said voltage across said high-voltage load and detects whether said difference is within a certain range, and when said difference is out of said range, said energizing signal is supplied to said first switch means.

11. An electric power supply for a vehicle according to claim 9, further comprising means for detecting a voltage across said high-voltage load, wherein said control means calculates a difference between said DC output voltage of said second rectifier and said voltage across said high-voltage load and detects whether said difference is within a certain range, and when said difference is out of said range, said energizing signal is supplied to said first switch means.

12. An electric power supply for a vehicle according to claim 10, wherein said armature winding is in star connection, and said multi-phase transformer is in polygonal connection.

13. An electric power supply for a vehicle according to claim 12, further comprising a rectifying element between the neutral point of said armature winding and at least one DC output terminal of said first rectifier.

14. An electric power supply for a vehicle according to claim 10, wherein said armature winding is in polygonal connection, and said multi-phase transformer is in star connection, and said power supply further comprises a rectifying element between the neutral point of said multi-phase transformer and at least one DC output terminal of said second rectifier.

15. An electric power supply for a vehicle according to claim 6, wherein said voltage regulation circuit has an initial exciting circuit for detecting a voltage induced in said armature winding, and for reducing the field current when said voltage induced in said armature winding is lower than a second predetermined value, and wherein said control means supplies a control signal to said initial exciting circuit to cause said initial exciting current to reduce said field current when said at least one period difference exceeds said first predetermined value.

16. An electric power supply for a vehicle according to claim 7, wherein said voltage regulation circuit has an initial exciting circuit for detecting a voltage induced in said armature winding, and for reducing the field current when said voltage induced in said armature winding is lower than a second predetermined value, and wherein said control means supplies a control signal to said initial exciting circuit to cause said initial exciting circuit to reduce said field current when said at least one period difference exceeds said first predetermined value.

17. An electric power supply for a vehicle according to any one of claims 1 to 5, further comprising current detecting means for detecting phase currents of the multi-phase AC output of said armature winding, and control means for producing a control signal to decrease said field current regardless of the operation of said voltage regulation circuit when at least one of the phase currents detected by said current detecting means exceeds a predetermined current.

18. An electric power supply for a vehicle according to any one of claims 1 to 5, further comprising current detecting means for detecting phase currents of the multi-phase AC output of said armature winding, control means for producing an alarm signal when at least one of the phase currents detected by said current detecting means exceeds a predetermined, and alarm means responsive to said alarm signal for lighting an indicator light.

19. An electric power supply for a vehicle according to claim 18, wherein said armature winding is in polygonal connection, said multi-phase transformer is in star connection, and said power supply further comprises a rectifying element connected between the neutral point of said multi-phase transformer and at least one of the DC output terminals of said second rectifier.

20. An electric power supply for a vehicle according to claim 19, further comprising switch means for connecting the primary and secondary windings of said multi-phase transformer in series.

21. An electric power supply for a vehicle, comprising:
a multi-phase AC generator driven by an engine of said vehicle, and including an armature winding, a field winding, a rectifier for rectifying a multi-phase AC output of said armature winding, and a voltage regulation circuit for regulating a DC output voltage of said rectifier by controlling a field current in said field winding in accordance with a control signal;
a battery charged by the DC output voltage of said rectifier;
a low-voltage load to be powered by said battery;
a high-voltage load needing a voltage higher than a voltage needed by said low-voltage load;
switch means responsive to a switching signal to selectively connect the DC output voltage of said rectifier to one of said high-voltage load and said battery;
a voltage converter for converting a high voltage across said high-voltage load into a lower voltage and applying said lower voltage to said battery; and
a controller responsive to a high-voltage output indicating signal to supply a control signal to said voltage regulation circuit, thereby causing said voltage regulation circuit to increase the field current, and to supply a switching signal to said switch means, thereby causing said switch means to connect said DC output voltage of said rectifier to said high-voltage load.

22. An electric power supply for a vehicle according to claim 21, further comprising means for detecting a voltage applied to said high-voltage load, and control means for supplying a control signal to said voltage regulation circuit to cause said voltage regulation circuit to stop said field current when said voltage detecting means detects a high voltage in the absence of the high-voltage output indicating signal.

23. An electric power supply for a vehicle according to claim 21, further comprising means for detecting a voltage applied to said high-voltage load, and a controller for generating an alarm signal when said voltage detecting means detects a high voltage in the absence of the high-voltage output indicating signal.

24. An electric power supply for a vehicle according to claim 22 or 23, wherein said voltage converter includes a switching regulator circuit to which the high voltage across said high-voltage load is applied, and from which the lower voltage to be applied to the battery is produced as an output.

25. An electric power supply for a vehicle according to claim 1, wherein said second rectifier comprises a plurality of output terminals at which said DC output voltage of said second rectifier is produced, and wherein none of said plurality of output terminals are connected to ground, thereby causing said DC output voltage of said second rectifier to be floating with respect to ground.

* * * * *